United States Patent
Fore

Patent Number: 5,305,543
Date of Patent: Apr. 26, 1994

[54] SLIP SINKER

[75] Inventor: George E. Fore, Sierra Blanca, Tex.

[73] Assignee: Catch-All Enterprises, Inc., Austin, Tex.

[21] Appl. No.: 19,076

[22] Filed: Feb. 18, 1993

[51] Int. Cl.[5] .............................................. A01K 91/00
[52] U.S. Cl. ..................................... 43/43.13; 43/44.9
[58] Field of Search .................. 43/44.96, 44.97, 17.2, 43/43.13, 43.1, 44.9, 44.91, 42.36

[56] References Cited

U.S. PATENT DOCUMENTS

| | | | |
|---|---|---|---|
| 661,100 | 11/1900 | Delanoy | 43/43.13 |
| 1,182,822 | 5/1916 | Volk | 43/44.97 |
| 1,993,114 | 3/1935 | Rasmussen | 43/43.13 |
| 2,036,954 | 4/1936 | Murray | 43/43.13 |
| 2,788,605 | 4/1957 | Rediess | 43/43.1 |
| 3,029,542 | 4/1962 | Agostini | 43/17.2 |
| 3,083,492 | 4/1963 | Kling | 43/43.13 |

FOREIGN PATENT DOCUMENTS

| | | | |
|---|---|---|---|
| 1176853 | 4/1959 | France | 43/43.13 |
| 0092398 | 7/1958 | Norway | 43/43.13 |
| 2219477 | 12/1989 | United Kingdom | 43/43.1 |

*Primary Examiner*—Paula A. Bradley
*Assistant Examiner*—James Miner
*Attorney, Agent, or Firm*—Matthew J. Booth

[57] ABSTRACT

The present invention is an improved slip sinker that consists of a unique non-concentrical, asymmetrical shape. The shape of the invention is basically conical, with one surface edge cylindrical, and the rest of the shape described by a paraboloid surface. The fishing line tunnel does not form an axial or axis of gravity for the unique shape. This combination of features allows the angler both to more successfully work the fishing tackle through submerged obstructions and reduce or eliminate fishing line twisting.

6 Claims, 2 Drawing Sheets

SLIP SINKER

BACKGROUND OF THE INVENTION

1. Field of the Invention

The present invention relates generally to a fishing line slip sinker and more specifically to a fishing line slip sinker with a non-concentric shape providing superior handling over and through submerged obstructions.

2. Description of the Related Art

An integral part of nearly all black bass fishing with soft plastic fishing lures is the slip sinker (also known as the slip weight). The purpose of the slip sinker is to maintain the fishing line and fishing lure on the water bottom. Lead is the usual fabrication material for slip sinkers although other materials are also suitable. Conventional slip sinkers typically range in weight from about 1/16 ounce to 1 ounce, and they come in a variety of concentrical, symmetrical shapes that include conical, bullet, spherical, or teardrop shapes. The aquadynamic shape of the slip sinker allows water to pass smoothly over the sinker's surface. The shape in turn allows the efficient retrieval of the sinker and lure (and hopefully fish) without adding an extra burden to the angler. Most of the conical and bullet shaped sinkers also have a concave bottom. The concave bottom increases the drag of the sinker in the water when the sinker is moving in the direction of the sinker's bottom. The effect produced by the concave bottom is that the slip sinker momentarily resists movement during the fish strike allowing the fish to start running with the lure without the added weight of the sinker.

A common feature to all slip sinkers is a fishing line tunnel that passes through the entire length of the sinker. The slip sinker's shape is concentrical and symmetrical about the line tunnel. This location effectively makes the line tunnel an axial or axis of gravity for the sinker's shape. The diameter of the fishing line tunnel is typically 3/64 inches and necessarily exceeds the diameter of the fishing line so that the fishing line is free to move through the sinker. As a result of the fishing line tunnel being larger than the fishing line, the slip sinker is free to move on the line as opposed to tying or crimping other kinds of weights on to the fishing line. Fish generally are very sensitive and will quickly drop any lure or bait that offers too much resistance. By having the fishing line pass freely through the line tunnel, a fish can grab the lure and run a short distance with it. At the same time, the freely moving slip sinker allows the angler to feel even the faintest nibble.

The location of the slip sinker in normal use is before the fishing hook or fishing lure. The angler threads the fishing line through the slip sinker point first and then on to the hook or lure. If the angler needs a fixed position for the sinker, "pegging" the sinker to the fishing line by inserting a toothpick into the fishing line tunnel captures the sinker onto the line.

Slip sinkers are terminal tackle. Terminal tackle means that slip sinkers are expendable as are hooks, swivels, lures, and other such fishing tackle items. When terminal tackle is lost during fishing, the loss usually occurs because the fishing line breaks. A major cause of line breakage is the slip sinker becoming wedged in rocks, brush, and other underwater obstructions. Conventional slip sinkers are susceptible to entangling or wedging for three reasons. First, there is little or no tendency for the pulling force on the slip sinker and fishing lure to change the attitude or orientation of a concentric slip sinker because the sinker's shape evenly distributes the pulling pressure (of the angler) across the sinker's weight and shape. Second, the concentrical, symmetrical shape of the slip sinker presents no variation in angles of encounter to the obstructions because the sinker's shape has only one rotational aspect about its axial. And third, the shape of the slip sinkers, especially the basic conical and bullet shapes, make the sinkers very effective wedges. The sinkers move point first into underwater obstructions, and when the angler tries to free the sinker, the angler invariably pulls and wedges the sinker further into the obstruction.

OBJECT AND SUMMARY OF THE INVENTION

An object of the present invention is to produce a slip sinker that greatly reduces the probability of losing the slip sinker because of the sinker becoming entangled in submerged obstructions.

A further object of the present invention is to produce a slip sinker that greatly reduces line twisting of the fishing line.

A feature of the present invention is the slip sinker's unique non-concentrical shape, a cylindrical paraboloid, that allows the slip sinker to travel through areas of submerged obstructions reducing the possibility of the sinker becoming entangled. Additionally, the slip sinker's unique shape greatly reduces line twisting when pegging the slip sinker to the fishing line.

An advantage of the present invention is that the angler spends less time getting the slip sinker loose from the submerged obstruction and untwisting the fishing line. This allows the angler to spend more time fishing.

A further advantage of the present invention is that the angler greatly reduces the amount of lost terminal tackle.

The present invention has a unique non-concentrical, asymmetrical shape. The shape is basically conical, with one surface edge cylindrical, and the rest of the shape described by a paraboloid surface. The fishing line tunnel runs from the vertex to the directex of the conical shape. Most importantly, the fishing line tunnel does not form an axial or an axis of gravity for the invention's shape. As a result of this unique combination, the present invention has two direct advantages over conventional slip sinkers.

The first advantage is that an angler can work the present invention over and through submerged obstructions with more success than a conventional slip sinker. As the sinker bumps or collides into an obstruction, the aspect of encounter between the sinker and the obstruction constantly changes because of the unique features of the invention. The invention greatly enhances the angler's ability to extract the fishing tackle from a wedging predicament. A typical concentric slip sinker does not have this superior extraction feature because the conventional sinker offers only a single or the same aspect of encounter between the sinker and the obstruction. And second, the present invention greatly reduces and usually stops line twisting when "pegging" the invention to the fishing line. The net result of this invention is that the angler spends more time fishing and less time attempting to retrieve fishing tackle in imminent peril of being forever lost.

DESCRIPTION OF THE DRAWINGS

To further aid in understanding the invention, the attached drawings help illustrate specific features of the invention. The following is a brief description of the attached drawings.

DETAILED DESCRIPTION OF THE INVENTION

Consideration of the following example, which is purely exemplary, further clarifies the use of the invention.

The present invention begins, as does all fishing sinkers, as a portion of a weighted material. Lead is the most common fabrication material although other materials are suitable as well. The preferred embodiment of the present invention is a weighted portion of lead ranging from about 1/16 ounce to 1 ounce. In the manufacturing process, pouring or injecting molten lead into a mold gives the weighted portion a distinct shape. The next and final step in making the invention is the drilling of the fishing line tunnel in the proper place. The combination of the invention's unique shape and unique placement of the fishing line gives the invention several distinct advantages to conventional slip sinkers.

Figure 1:
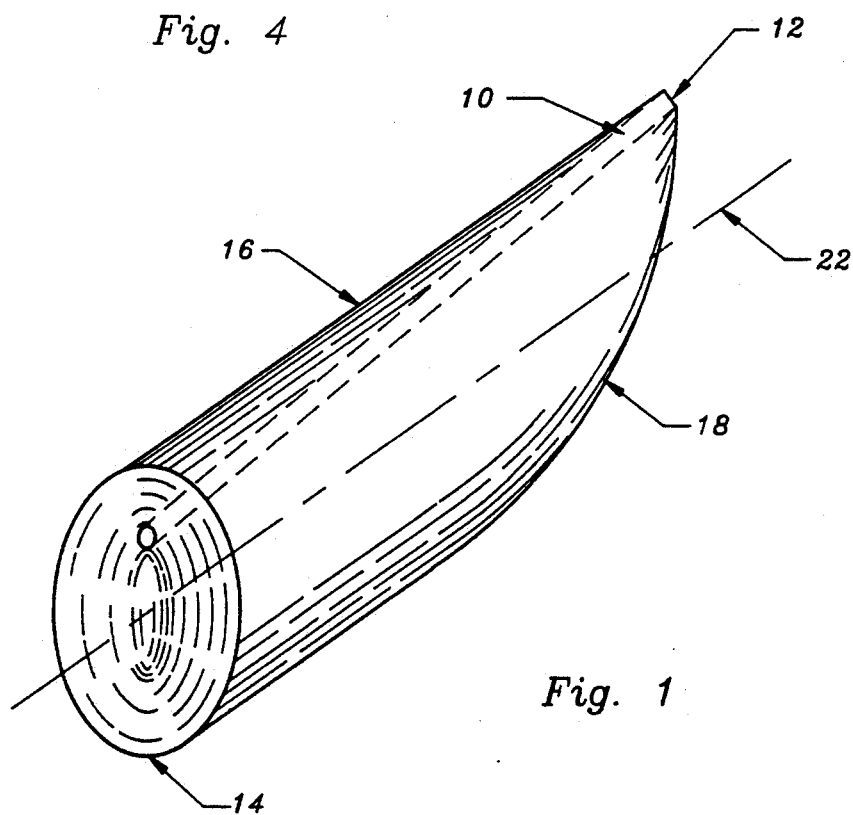
FIG. 1 is a perspective view of the preferred embodiment of the invention.

FIG. 1 is a perspective view of the preferred embodiment of the invention. The present invention has a conical shape with a point or vertex 12 and a bottom or directex 14. The vertex 12 of the sinker points toward the angler, and points in the direction that the angler reels in the slip sinker and fishing lure. The directex 14 points in the direction of the fishing lure or fishing hook and hopefully the fish. The fishing line tunnel 10 starts at the vertex 12 and goes completely through the slip sinker to the directex 14. The fishing line tunnel 10 is typically 3/64 inches in diameter or large enough to receive the fishing line and allow the line to pass easily and completely through the tunnel. The fishing line tunnel 10 opens out into the directex 14. The directex 14 is a circular shape. If the slip sinker's bottom is a flat surface, the directex 14 defines the bottom of the sinker. If the sinker's bottom is a concave surface as it is in the preferred embodiment, the directex 14 defines a bottom plane with the concave surface 20 (of FIG. 2) being the bottom surface of the sinker. The cylindrical edge 16 connects the directex 14 and the vertex 12. The rest of sinker from the vertex 12 to the directex 14 generally describes a paraboloid surface 18. Line 22 is a reference line for aiding in the description of the invention and runs through the center circular surface of the directex 14. The reference line 22 intersects the plane of the directex 14 in a 90° angle.

Figure 4:
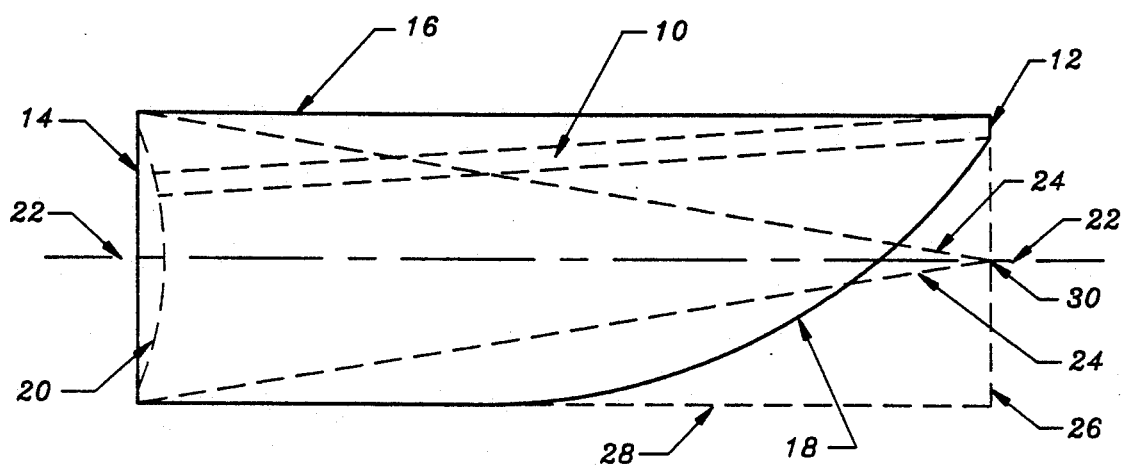
FIG. 4 is a view FIG. 2 overlaid with a cylinder and a right circular cone to aid in the description of the preferred embodiment.
Figure 2:
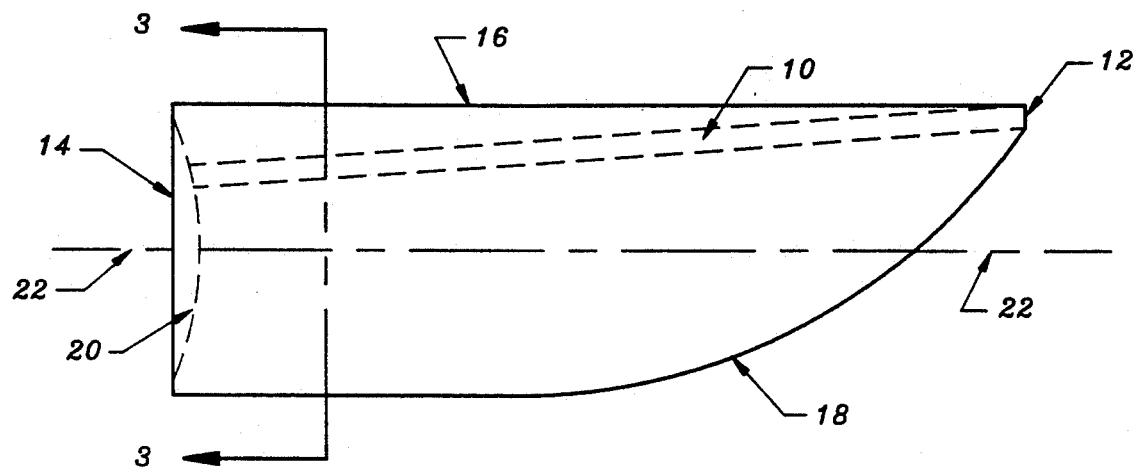
FIG. 2 is a side view of the preferred embodiment.

FIG. 4 is a view FIG. 2 overlaid with a cylinder and a right circular cone to aid in the description of the preferred embodiment. This view better describes the unique shape of the invention. The shape of the invention is generally conical. Reference line 22 describes a right circular cone with generator line 24, directex 14, and vertex 30. Offsetting vertex 30 of the right circular cone produces the position of the invention's vertex 12. The cylindrical edge or upper edge 16, connecting vertex 12 of the invention with directex 14, forms a 90° angle with the plane of directex 14 and connects to the circular edge of directex 14. Superimposing a cylinder on top of the invention forms a cylinder with directex 14 of the invention as one circular end of the cylinder with circular end 26 as the other end of the cylinder. The sides of the superimposed cylinder, when viewed in a side view, are the cylindrical edge 16 of the invention and cylindrical edge 28. The rest of the surface of the invention, connecting vertex 12 to directex, describes the paraboloid surface 18.

Figure 3:
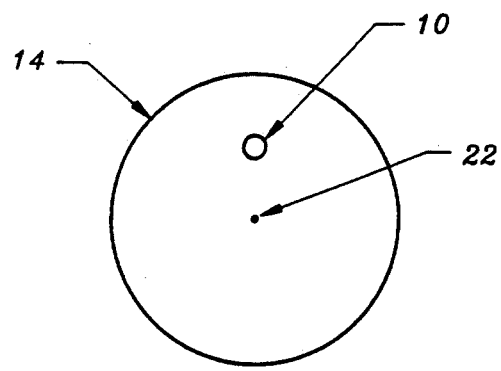
FIG. 3 is a side view of the preferred embodiment.

FIG. 2 is a side view of the invention without the superimposed shapes from FIG. 4. The bottom of the invention is either a flat surface such as directex 14, or the bottom is a concave surface 20. The concave surface 20 is the preferred embodiment of the present invention. The fishing line tunnel 10 runs from the vertex 12 to the concave surface 20 (or to the directex 14 depending on the type of bottom). FIG. 3 shows the location of the fishing line tunnel 10, as the tunnel comes out onto the directex 14, relative to reference line 22.

In combination with the unique shape of the sinker, the placement of the fishing line tunnel 10 is highly critical. In the present invention, the fishing line tunnel 10 neither forms an axial or an axis of gravity for the invention's unique shape, not is the tunnel parallel to any of invention's outside surfaces. Placing the line tunnel 10 off the axial in this manner produces a non-concentrical, asymmetrical distribution of the sinker's weight around the fishing line tunnel 10. With this combination, gravity forces the slip sinker to align as in FIG. 2 with the paraboloid surface 18 being in the downward orientation when the angler is reeling in the sinker. As the slip sinker then travels over submerged obstructions, the shape and weight distribution of the present invention cause the slip sinker to rotate constantly around the fishing line. The rotating surface of the sinker presents different angles of encounter to submerged obstructions as the sinker passes over the obstructions. The constantly changing angle of encounter reduces the probability of the sinker entangling with or wedging into an obstruction. The result is that the sinker more readily passes through obstructions than conventional slip sinkers, and allows the angler to spend more time fishing instead of retrieving soon to be lost tackle.

The placement of the fishing line tunnel 10 combined with the invention's unique shape greatly reduces and usually stops line twisting of the fishing line when desired. The aqua-dynamics of many fishing lures, including almost all soft plastic baits, often cause the lures to rotate around the direction of the pulling force of the fishing line during retrieval. This rotation of the lure results in line twist (of the fishing line), which in turn causes the fishing line to foul on the reel spool. Retrieving the lure faster, using larger lures, or attaching the fishing hook off the center of the lure further aggravates the line twisting phenomena. Pegging a conventional slip sinker to fishing line actually increases, not decreases, line twisting because the sinker, with the attached fishing line, rotates as a counter balance to both the rotation of the lure and the direction of the pulling force of the fishing line. On the other hand, pegging the invention to fishing line greatly reduces and usually stops line twisting. Moving the fishing line tunnel 10 off the axis of gravity increases the amount of force necessary to rotate the invention completely around the direction of the pulling force of the fishing line. As a result, the natural tendency of the invention now is to sway from side to side, instead of fully rotating, when opposing the rotation of the fishing lure. Pegging a small embodiment of the invention even when using a large fishing lure greatly reduces or eliminates line twisting.

Other embodiments of the invention are apparent to those skilled in the art after considering this specification or practicing the disclosed invention. The specification and examples above are exemplary only, with the true scope of the invention being indicated by the following claims.

I claim the following invention:

1. An improved fishing line slip sinker, comprising:
   a body generally having a conical shape, said body in cross sectional area having an upper edge connecting a vertex to a bottom periphery wherein said upper edge being perpendicular to said bottom periphery, the remainder of said body being described generally by a forward edge connecting said vertex to said bottom periphery and forming a paraboloid surface; and
   a fishing line tunnel extending between said vertex and said bottom periphery wherein said fishing line tunnel being located entirely above the central axis of gravity of said body and not parallel to said upper edge, the forward periphery of said fishing line tunnel substantially defining said vertex, the location of said fishing line tunnel creates an asymmetrical weight distribution with the greater part of said weight lying below said fishing line tunnel.

2. The fishing line slip sinker of claim 1 wherein said bottom periphery forms a flat surface.

3. The fishing line slip sinker of claim 1 wherein said bottom periphery forms a concave surface.

4. An improved fishing line slip sinker, comprising:
   a body generally having a conical shape, said body in side view having an upper edge connecting a vertex to a bottom plane wherein said upper edge forms a 90 degree angle with said bottom plane at the rearward portion of said body, the remainder of said body is described generally by a forward edge connecting said vertex to said bottom plane and forming a paraboloid surface; and
   a fishing line tunnel extending between said vertex and said bottom plane wherein the location of said fishing line tunnel is entirely above the central axis of gravity of said body and is not parallel to said upper edge, the forward periphery of said fishing line tunnel substantially defining said vertex, said location of said fishing line tunnel creates an asymmetrical weight distribution around said fishing line tunnel with the greater part of said asymmetrical weight distribution lying below said fishing line tunnel and the lesser part of said asymmetrical weight distribution lying above said fishing line tunnel.

5. The fishing line slip sinker of claim 4 wherein said bottom plane forms a flat surface.

6. The fishing line slip sinker of claim 4 wherein said bottom plane forms a concave surface.

* * * * *